United States Patent
Daniel (10) Patent No.: US 8,332,593 B2
(45) Date of Patent: Dec. 11, 2012

(54) MEMORY SPACE MANAGEMENT AND MAPPING FOR MEMORY AREA NETWORK

(75) Inventor: David A. Daniel, Scottsdale, AZ (US)

(73) Assignee: Nuon, Inc., Scottsdale, AZ (US)

(*) Notice: Subject to any disclaimer, the term of this patent is extended or adjusted under 35 U.S.C. 154(b) by 210 days.

(21) Appl. No.: 12/655,097

(22) Filed: Dec. 23, 2009

(65) Prior Publication Data

US 2010/0161912 A1    Jun. 24, 2010

Related U.S. Application Data

(60) Provisional application No. 61/203,695, filed on Dec. 24, 2008.

(51) Int. Cl.
*G06F 12/00* (2006.01)

(52) U.S. Cl. ......... 711/147; 711/E12.068; 711/E12.085; 711/203; 711/154

(58) Field of Classification Search ............ 711/150, 711/E12.002, 148, 149, E12.016, E12.065, 711/E12.068, E12.085, 203, 209; 709/219, 709/249, 250

See application file for complete search history.

(56) References Cited

U.S. PATENT DOCUMENTS

| | | | |
|---|---|---|---|
| 6,356,863 B1 * | 3/2002 | Sayle ........................ | 709/219 |
| 7,694,312 B2 * | 4/2010 | Rivard et al. ............... | 719/321 |
| 2006/0206891 A1 * | 9/2006 | Armstrong et al. ........... | 718/1 |

* cited by examiner

*Primary Examiner* — Pierre-Michel Bataille
(74) *Attorney, Agent, or Firm* — Larkin Hoffman Daly & Lindgren Ltd.; Robert C. Klinger (57) ABSTRACT

A mechanism for simultaneous multiple host access to shared centralized memory space via a virtualization protocol utilizing a network transport. The invention combines local memory interfacing with the handling of multiple hosts implementing virtualized memory-mapped I/O systems, such that the memory becomes a global resource. The end result is a widely distributed memory-mapped computer cluster, sharing a 2^64 byte memory space.

18 Claims, 9 Drawing Sheets

| TIER | DESIGNATION | ACCESS | DESCRIPTION |
|---|---|---|---|
| 0 | CPU Cache | Mem Map | Tightly coupled onboard high-speed RAM |
| 1 | System Memory | Mem Map | DRAM accessible via Memory Controller (ie DDRx) |
| 2 | Graphics Memory | Mem Map | RAM and ROM tightly coupled to graphics processor and CPU |
| 3 | Solid State Memory Expansion | Mem Map | Any onboard memory (volatile or non-volatile) mapped to the CPU address space. |
| 4 | Internal Solid State Drive (SSD) | Block | High performance non-volatile mass data storage. File System compatible with standard HDDs. |
| 5 | Internal Hard Disk Drive (HDD) | Block | Typical system non-volatile mass data storage |
| 6 | Direct Attached Storage (DAS) | Block | Local mass storage expansion typically used for archives, backups, and data intensive applications |
| 7 | Enterprise Storage Area Network (SAN) SSD | Block | High-performance pooled network storage accessible by multiple clients. File System compatible with standard HDDs. |
| 8 | Enterprise SAN HDD | Block | Typical pooled network mass storage accessible by multiple clients. |
| 9 | Enterprise Network Attached Storage (NAS) | File | Typical enterprise file storage and retrieval. |
| 10 | Internet SAN HDD | Block | Globally distributed enterprise mass storage accessible by multiple clients connected via the Internet. |
| 11 | Internet Network Attached Storage (NAS) | File | Typical Internet file download and upload. |

FIG. 3

| TIER | DESIGNATION | ACCESS | DESCRIPTION |
|---|---|---|---|
| 0 | CPU Cache | Mem Map | Tightly coupled onboard highspeed RAM |
| 1 | System Memory | Mem Map | DRAM accessible via Memory Controller (ie DDRx) |
| 2 | Graphics Memory | Mem Map | RAM and ROM tightly coupled to graphics processor and CPU |
| 3 | Solid State Memory Expansion | Mem Map | Any onboard memory (volatile or non-volatile) mapped to the CPU address space. |
| 4 | *Direct Attached MeMAN* | *Mem Map* | *Directly attached external memory (volatile or non-volatile) mapped to the CPU address space.* |
| 5 | Internal Solid State Drive (SSD) | Block | High performance non-volatile mass data storage. File System compatible/w std. HDDs. |
| 6 | Internal Hard Disk Drive (HDD) | Block | Typical system non-volatile mass data storage |
| 7 | Direct Attached Storage (DAS) | Block | Local mass storage expansion typically used for archives, backups, and data intensive applications |
| 8 | *Enterprise MeMAN* | *Mem Map* | *Pooled external memory (volatile or non-volatile) addressable by multiple clients from within an enterprise.* |
| 9 | Enterprise Storage Area Network (SAN) SSD | Block | High-performance pooled network storage accessible by multiple clients. File System compatible with standard HDDs. |
| 10 | Enterprise SAN HDD | Block | Typical pooled network mass storage accessible by multiple clients. |
| 11 | Enterprise Network Attached Storage (NAS) | File | Typical enterprise file storage and retrieval. |
| 12 | *Internet MeMAN* | *Mem Map* | *Globally distributed enterprise pooled external memory (volatile or non-volatile) addressable by multiple clients connected via the Internet.* |
| 13 | Internet SAN HDD | Block | Globally distributed enterprise mass storage accessible by multiple clients connected via the Internet. |
| 14 | Internet Network Attached Storage (NAS) | File | Typical Internet file download and upload. |

**************** MEMORY SUMMARY ****************

Memory Usage Summary:
    [0000000000000000 - 000000000009FFFF] System board
    [00000000000A0000 - 00000000000BFFFF] PCI bus
        [00000000000A0000 - 00000000000BFFFF] PCI standard PCI-to-PCI bridge
            [00000000000A0000 - 00000000000BFFFF] Standard VGA Graphics Adapter
    [00000000000C0000 - 00000000000DFFFF] PCI bus
    [00000000000F0000 - 00000000000F3FFF] System board
    [00000000000F4000 - 00000000000F7FFF] System board
    [00000000000F8000 - 00000000000FBFFF] System board
    [00000000000FC000 - 00000000000FFFFF] System board
    [0000000000100000 - 000000007FEEFFFF] System board
    [000000007FEF0000 - 000000007FEFFFFF] System board
    [000000007FF00000 - 00000000FEBFFFFF] PCI bus
        [00000000C0000000 - 00000000CFFFFFFF] PCI standard PCI-to-PCI bridge
            [00000000C0000000 - 00000000CFFFFFFF] Standard VGA Graphics Adapter
        [00000000D0000000 - 00000000D2FFFFFF] PCI standard PCI-to-PCI bridge
            [00000000D0000000 - 00000000D0FFFFFF] Standard VGA Graphics Adapter
            [00000000D1000000 - 00000000D1FFFFFF] Standard VGA Graphics Adapter
        [00000000D4000000 - 00000000D4003FFF] Marvell Yukon 88E8001/8003/8010 PCI Gigabit Ethernet Controller
        [00000000D5000000 - 00000000D5003FFF] Microsoft UAA Bus Driver for High Definition Audio
        [00000000D5004000 - 00000000D5004FFF] NVIDIA nForce 430/410 Serial ATA Controller
        [00000000D5005000 - 00000000D5005FFF] NVIDIA nForce 430/410 Serial ATA Controller
        [00000000D5006000 - 00000000D5006FFF] Standard OpenHCD USB Host Controller
        [00000000D5007000 - 00000000D50070FF] Standard Enhanced PCI to USB Host Controller
        [00000000E0000000 - 00000000EFFFFFFF] Motherboard resources
    [00000000FEC00000 - 00000000FEC00FFF] System board
    [00000000FEE00000 - 00000000FEE00FFF] System board
    [00000000FEFF0000 - 00000000FEFF03FF] High precision event timer
        [00000000FEFF0000 - 00000000FEFF03FF] System board
        [00000000FEFF0000 - 00000000FEFF00FF] System board
    [00000000FFFF0000 - 00000000FFFFFFFF] System board

MEMORY SPACE MANAGEMENT AND MAPPING FOR MEMORY AREA NETWORK

CLAIM OF PRIORITY

This application claims priority of U.S. Provisional Patent Application Patent Application Ser. No. 61/203,695 entitled "MEMORY SPACE MANAGEMENT AND MAPPING FOR MEMORY AREA NETWORKS" filed Dec. 24, 2008, the teachings of which are incorporated herein by reference.

FIELD OF THE INVENTION

The present invention relates to computer expansion and virtualization via high speed data networking protocols and specifically to techniques for creating and managing shared global memory resources.

BACKGROUND OF THE INVENTION

Virtualization, iSCSI, PCI Express and i-PCI

There is growing acceptance of techniques that leverage networked connectivity for extending the resources of host computer systems. In particular, networked connectivity is being widely utilized for specialized applications such as attaching storage to computers. For example, iSCSI makes use of TCP/IP as a transport for the SCSI parallel bus to enable low cost remote centralization of storage.

PCI Express, as the successor to PCI bus, has moved to the forefront as the predominant local host bus for computer system motherboard architectures. PCI Express allows memory-mapped expansion of a computer. A cabled version of PCI Express allows for high performance directly attached bus expansion via docks or expansion chassis.

A hardware/software system and method that collectively enables virtualization and extension of its memory map via the Internet, LANs, WANs, and WPANs is described in copending commonly assigned U.S. patent application Ser. No. 12/148,712 and designated "i-PCI", the teachings of which are incorporated herein by reference.

Figure 1:
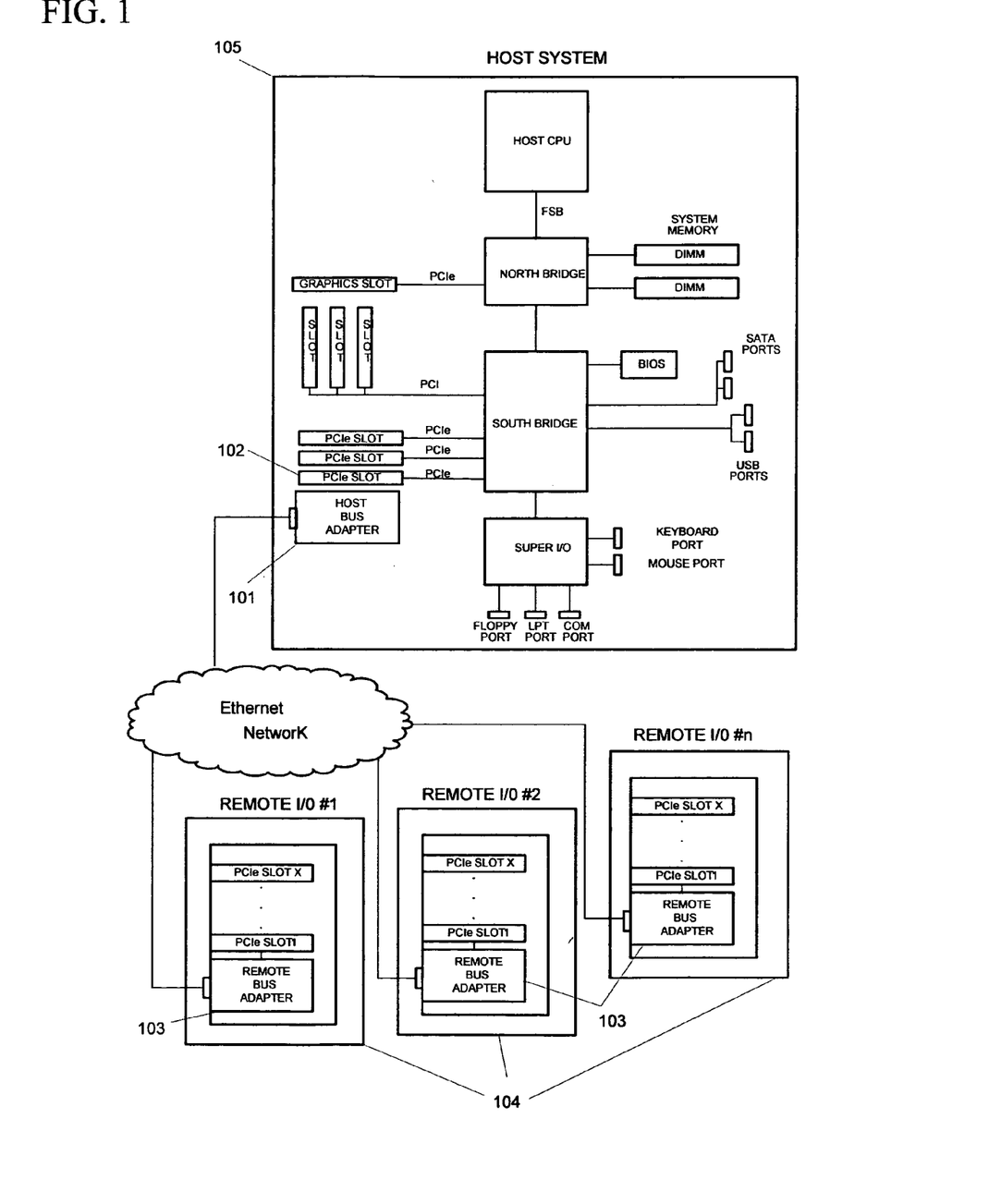
FIG. 1 depicts using the Internet as a means for extending a computer system's native bus via high speed networking.

The i-PCI protocol extends the PCI I/O System via encapsulation of PCI Express packets within network routing and transport layers and Ethernet packets and then utilizes the network as a transport. The network is made transparent to the host and thus the remote I/O appears to the host system as an integral part of the local PCI system architecture. The result is a virtualization of the host PCI System. The i-PCI protocol allows certain hardware devices (in particular I/O devices) native to the host architecture (including bridges, I/O controllers, and I/O cards) to be located remotely. FIG. 1 shows a detailed functional block diagram of a typical host system [105] connected to multiple remote I/O chassis [104]. An i-PCI host bus adapter card [101] installed in a host PCI Express slot [102] interfaces the host to the network. An i-PCI remote bus adapter card [103] interfaces the remote PCI Express bus resources to the network. For further in-depth discussion of the i-PCI protocol see U.S. patent application Ser. No. 12/148,712, the teachings which are incorporated by reference.

MeMAN

With the summary of iSCSI, PCI Express, i-PCI as a backdrop, the background discussion shifts to computer system memory organization.

Data in a given computer system is typically written and read in organized tiers of memory devices. These tiers are arranged according to the speed and volume with which data has to be written or read.

At one extreme of high speed and small volume, a Computer Processing Unit (CPU) employs on-chip cache registers and fast memory for storing small data units (multiple bytes) which move in and out of the CPU rapidly (sub-nanosecond speed).

The next lower tier involves programs and data that are stored in solid state memory (typically DRAM) utilized by the CPU and referenced in terms of the memory address space. This data is often accessed in a size of tens of bytes and at nanosecond speed.

In the mid-tier range, memory-mapped computer peripheral cards are found, where memory is tightly coupled to the CPU via onboard computer I/O buses such as PCI and PCI Express.

As utilization moves to the lower tiers, it involves mass data stored in electro-mechanical storage devices such as hard disk drives (HDDs). Disk arrays are often used, interconnected by parallel cables such as SCSI or by serial interfaces such as SATA. Since data is stored in a spinning magnetic storage medium, access speed is typically in milliseconds. The data is addressed in blocks of size exceeding one hundred bytes.

For very large storage requirements, arrays of distributed disk storage are often deployed. In the scenario of Direct Attached Storage (DAS), a short external cabled bus such as a SCSI or USB allows multiple hard disks to be located outside a computer.

In the scenario of Storage Area Network (SAN), such as a Fibre Channel network, a large number of hard drives may be distributed in multiple storage arrays, interconnected by local transmission links and switches and accessible by multiple clients. The clients of this mass storage access the storage server to retrieve data.

iSCSI is another example of a SAN application. In the case of iSCSI, data storage may be distributed over a wide area through a Wide Area Network (WAN). The Internet-SCSI (iSCSI) protocol encapsulates SCSI format data in Internet Protocol (IP) datagrams, which are then transported via the global Internet.

The lowest tier is utilized for storage and retrieval of larger data units such as files of Megabyte size at much lower speed (i.e. seconds). The Network File Server (NFS) is an example of a protocol for file retrieval over LANs and the Internet. Hard disks are the typical storage medium, but other slower speed medium such as magnetic tape may also be used. This very low tier of storage typically is used for archival purposes when huge volume of data is stored but retrieved very infrequently.

Figure 2:
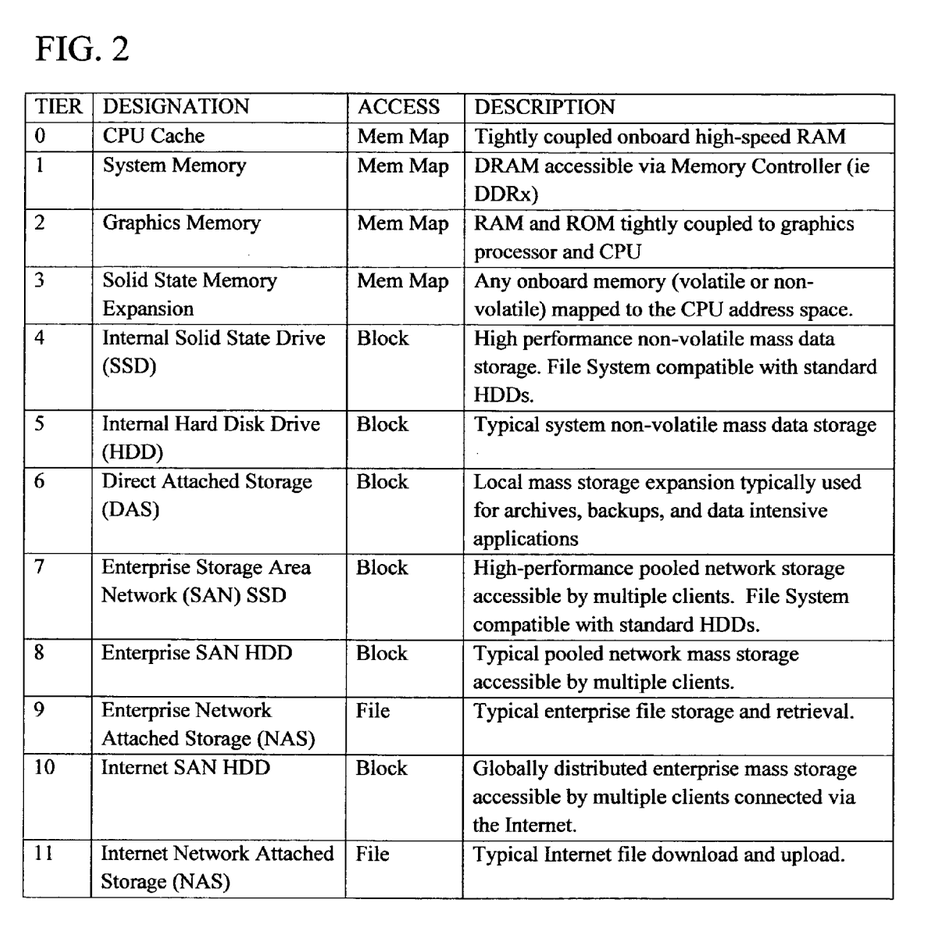
FIG. 2 is a list of the various tiers of memory, arranged from highest performance to lowest performance.

FIG. 2 shows a list of the various Tiers, arranged from highest performance to lowest performance, with Tier 0 being the highest performance. It may be observed, in reviewing the various tiers of memory, that the only type of memory access once you move out across the Ethernet network is block access or file access. The problem is there is presently no practical memory mapped access solution once you move beyond the host. Addressable memory has several advantages, including much finer granularity of data manipulation. With memory-mapped access, byte level manipulation and transactions are possible.

As 32-bit processors and operating systems give way to 64-bit systems, the associated memory map expands from $2^{32}=4$ gigabyte of addressable memory space to $2^{64}=16$ Exabyte of addressable memory space. Thus a tremendous amount of addressable memory is now possible. With this huge amount of memory potential available to the CPU, it is no longer technically necessary to assign mass storage to disk drives which limit the CPU to block or file level access. It would be desirable to have some portion of these memory-mapped resources distributed outside the computer and located in pools on a network or the Internet, such that the memory may be shared and addressable by multiple clients.

MeMAN disclosed in commonly assigned copending U.S. Patent Application Ser. No. 61/197,100 the teachings which are incorporated by reference is the concept of new classes—or "tiers"—of solid state addressable memory accessible via a high data rate Ethernet or the Internet. MeMAN stated another way, is the technology of addressable memory access via a network.

MeMAN enables the practical use of very large amounts of memory, external to a host computer system. With physical locality and confinement removed as an impediment, large quantities of memory, here before impractical to physically implement, now become practical. Memory chips and circuit cards (particularly in the form of solid state memory cards) no longer need be installed directly in a host system. Instead, the memory resources may be distributed or located centrally on a network, as convenient; in much the same manner that mass storage is presently implemented.

MeMAN leverages i-PCI as the foundational memory-mapped I/O expansion and virtualization protocol and extends the capability to include shared global memory resources. The net result is the potential for unprecedented amounts of collective memory—defined and managed in performance tiers—available for cooperative use between computer systems. MeMAN results in at least three new tiers of computer memory:

1. Memory-mapped computer memory located as Directly Attached Memory. This is located between Tiers 3 and 4 in FIG. 2.
2. Memory-mapped computer memory located on an Enterprise LAN. This is located between Tiers 6 and 7 in FIG. 2.
3. Memory-mapped computer memory located on the Internet. This is located between Tiers 9 and 10 in FIG. 2.

The resulting revised Memory Tiers are shown listed in FIG. 3.

Figure 4A:
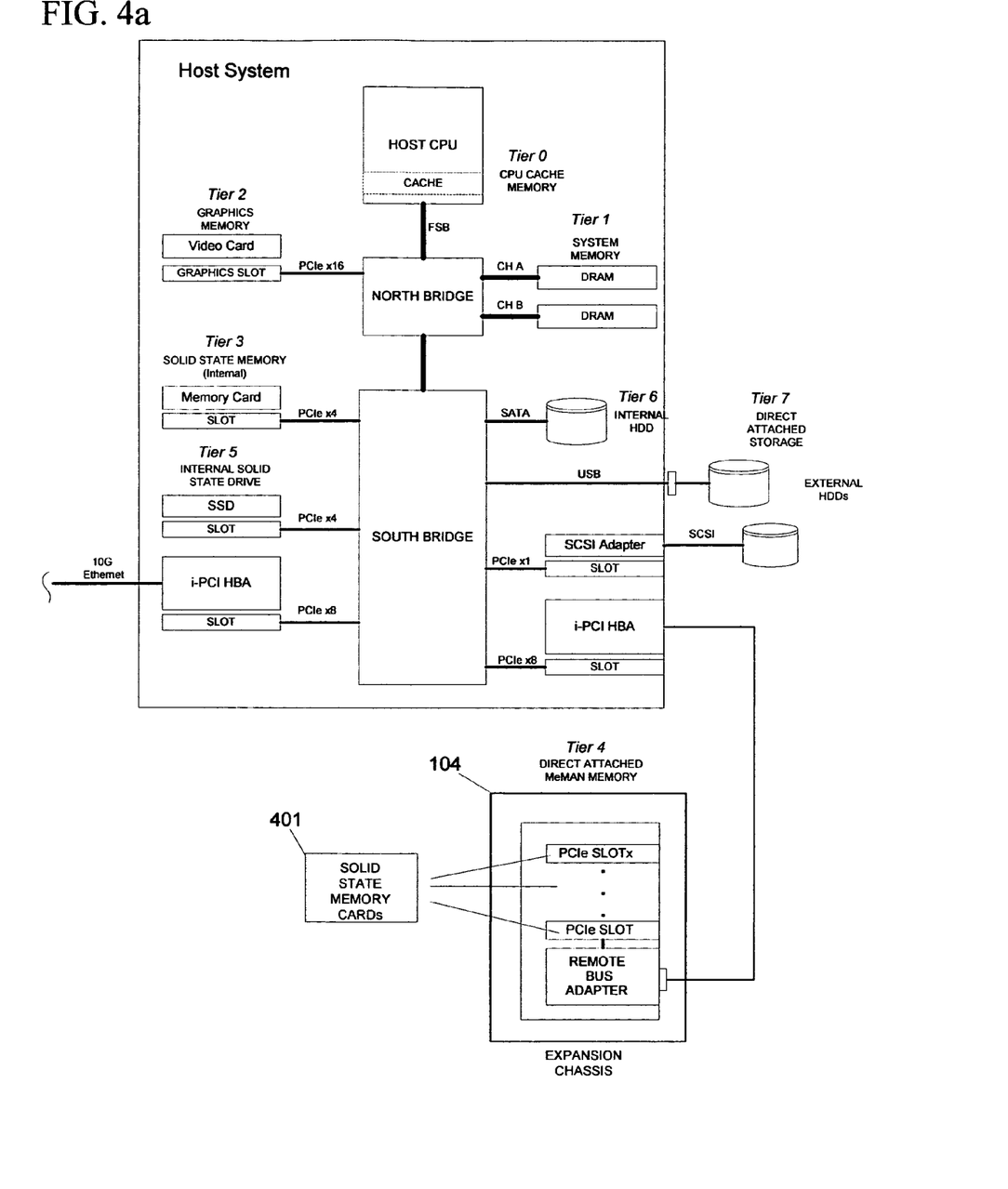
FIG. 4 is a revised illustration of where three new tiers of computer memory may be found as a result of MeMAN.
Figure 4B:
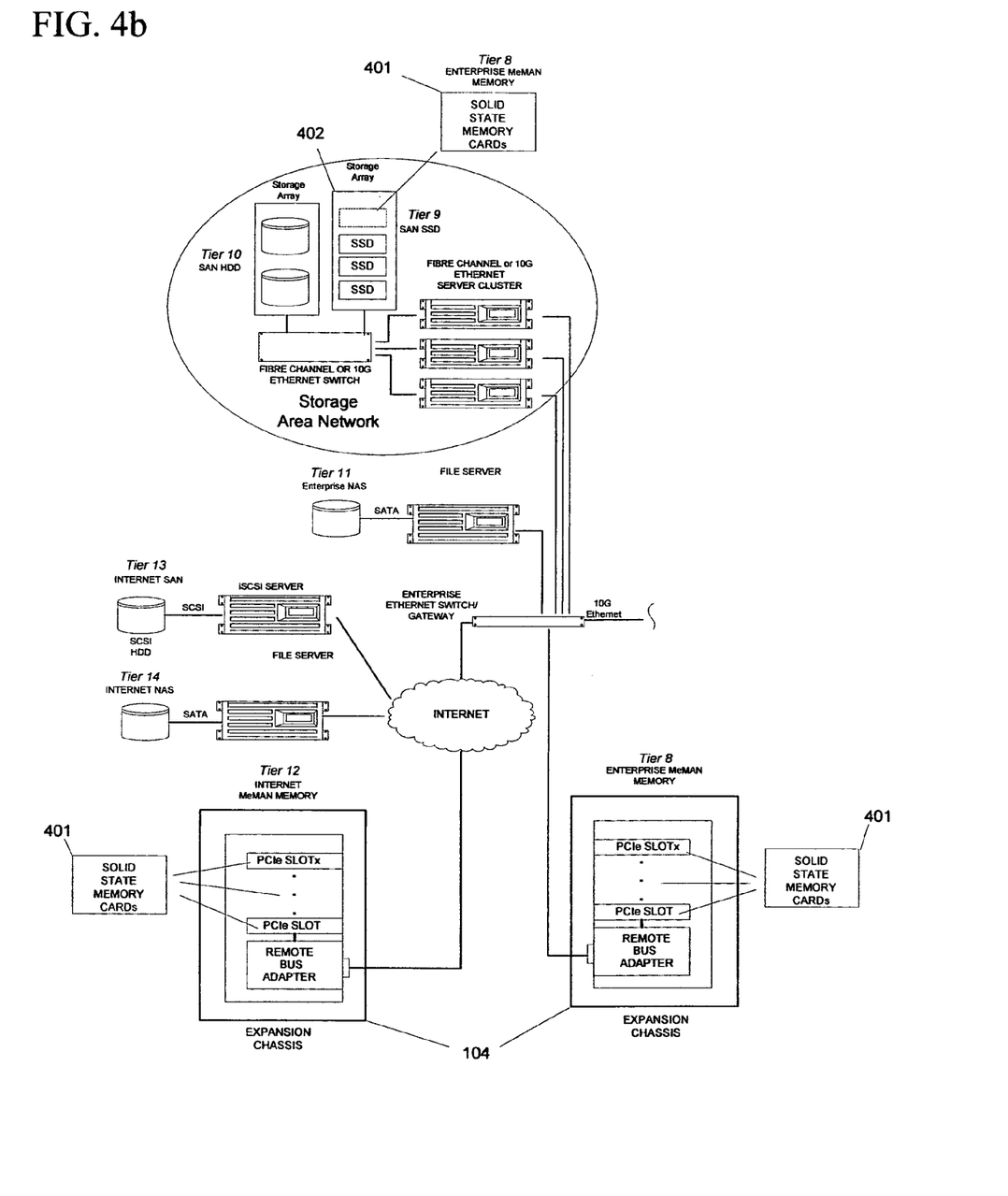

Referring to the corresponding FIG. 4, it may be seen how all the Tiers, the remote I/O expansion chassis [104], and solid state memory cards [401] fit into to the overall memory scheme enabled by MeMAN.

Several technical challenges are presented by MeMAN, including how to handle the unprecedented amounts of collective memory and the related issues of simultaneous multiple host access and memory map sharing in a network environment.

SUMMARY OF THE INVENTION

The present invention achieves technical advantages by providing MeMAN Memory Manager and Shared Memory Access Controller (SMAC), configurable for simultaneous multiple host access and memory map sharing via a network. The MeMAN Memory Manager and SMAC are a unique solution in that it provides a solution for combining local memory interfacing with the handling of multiple hosts implementing virtualized memory-mapped I/O systems, such that the memory becomes a global resource. The end result is a widely distributed memory-mapped computer cluster, sharing a $2^{64}$ byte memory space.

The invention leverages the i-PCI protocol as defined by U.S. patent application Ser. No. 12/148,712, and MeMAN as defined by U.S. Patent Application Ser. No. 61/197,100 the teachings which are incorporated by reference.

BRIEF DESCRIPTION OF THE DRAWINGS

FIG. 3 is an illustration of where various tiers of memory may be found in a networked computing environment;

FIG. 5 shows an example 64-bit memory map for a host system;

DETAILED DESCRIPTION OF THE PRESENT INVENTION

For MeMAN, the Remote I/O (Expansion Chassis) [104] as shown in FIG. 1 and FIG. 4 may be populated with solid state memory cards [401]. The solid state memory cards [401] are enumerated by the client system and appear as PCI Express addressable memory to the client computer. Note that these memory cards do not appear to the system as disk drives—they appear as memory-mapped resources.

PCI Express supports 64-bit addressing; however for MeMAN, the PCI bridges in the data transfer path must all support prefetchable memory on the downstream side. A Solid State Memory Card [401] is seen as a prefetchable memory target and the configuration software assigns a sub-range of memory addresses to the card, within the $2^{64}$ memory space. The memory could be of any addressable type, including NOR-type Flash, ROM, or RAM.

FIG. 5 shows an example 64-bit memory map for a host system. In this example the host system resources are all assigned within the lower 32-bit (4 GB) memory space (0000000-FFFFFFFF). If this system were to implement MeMAN, unused memory space above the 4 GB could be mapped as prefetchable memory.

If a given remote I/O (expansion chassis) [104] or Storage Array [402] is populated with 10 solid state memory cards [401], each of which provides 1 Terabyte (1000 GB) of memory, the address space required is 10 Terabytes. This 10 Terabytes may be assigned a segment of prefetchable memory, beginning at the 4G boundary from 100000000h-9C500000000h as follows:

Memory Card 1: 000000 0100000000-000000FAFFFFFFFF

Memory Card 2: 000000FB00000000-000001F4FFFFFFFF

Memory Card 3: 000001F500000000- 000002EEFFFFFFF

Memory Card 4: 00000 2EF00000000-000003E8FFFFFFFF

Memory Card 5: 000003E900000000-000004E2FFFFFFFF

Memory Card 6: 000004E300000000-000005DCFFFFFFFF

Memory Card 7: 000005DD00000000-000006D6FFFFFFFF

Figure 6:
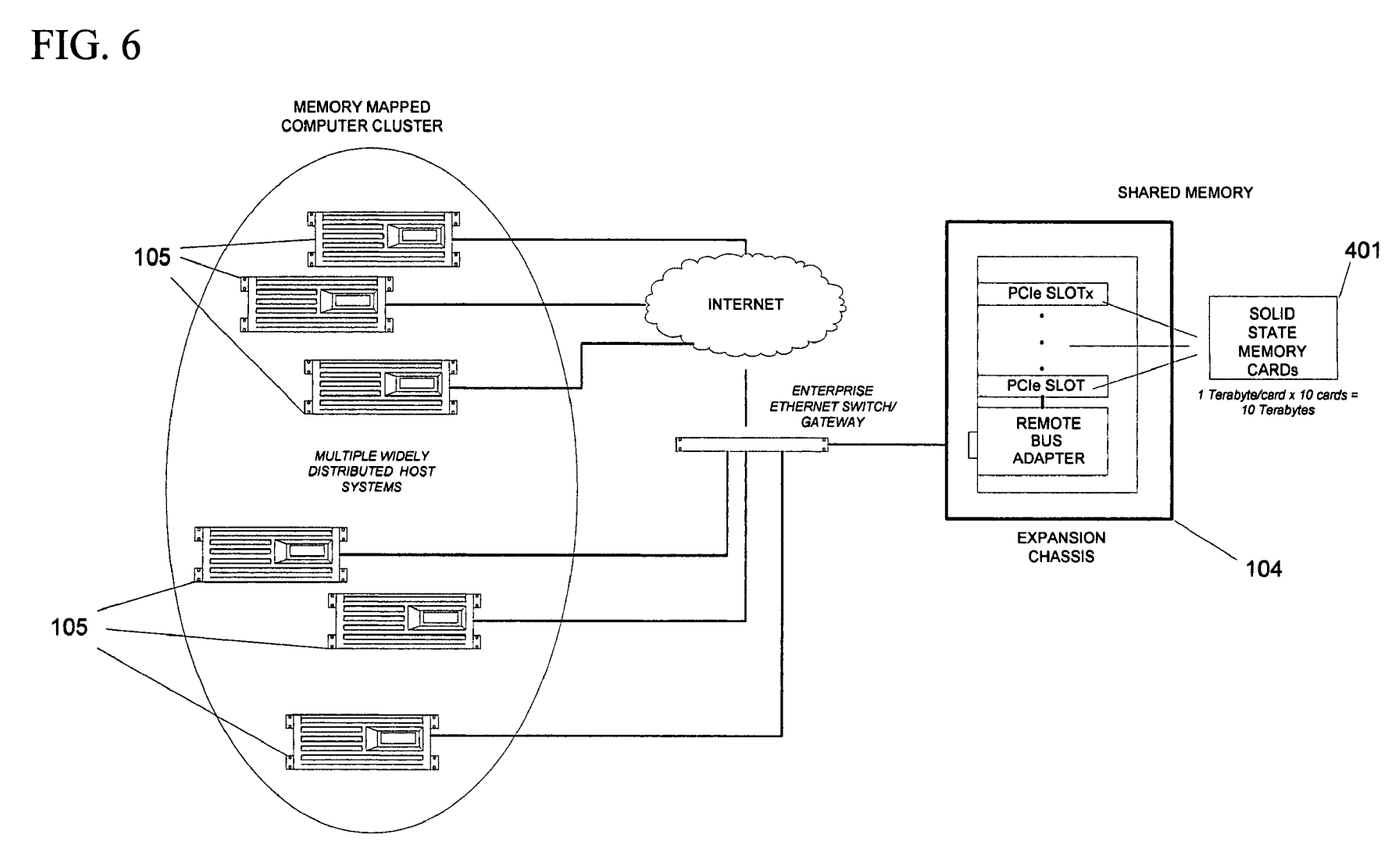
FIG. 6 shows multiple hosts sharing the same shared memory via Storage Arrays and Remote I/O.

Memory Card 8: 000006D700000000-000007D0FFFFFFFF
Memory Card 9: 000007D100000000-000008CAFFFFFFFF
Memory Card 10: 000008CB00000000-000009C4FFFFFFFF Referring to FIG. 6, when implementing MeMAN, it is possible for memory—in the form of unique solid state memory cards [401] to be located in a Remote I/O [104] or (Storage Array) to be mapped to more than one widely distributed host [105] or "client". These clients may work individually or in collaboration as a multiprocessor system.

Figure 7:
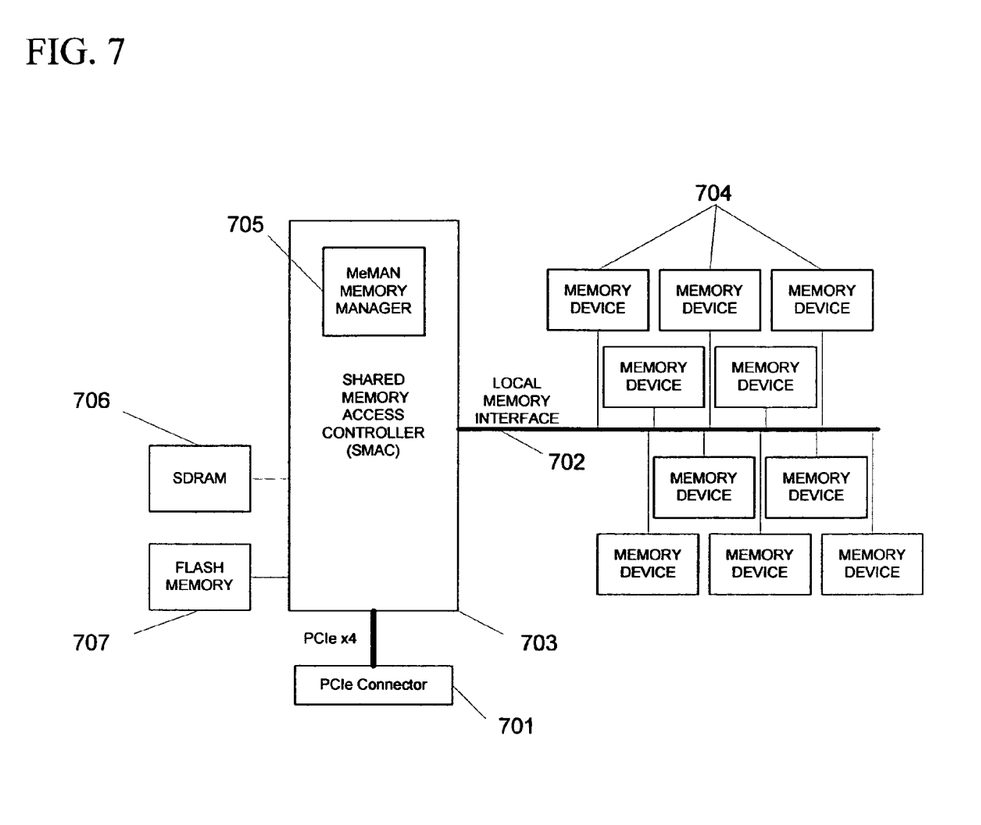
FIG. 7 is a block diagram of the MeMAN Memory card.

Referring to FIG. 7, the major functional blocks for the invented MeMAN solid state memory card consists of a PCI Express edge connector [701] which connects to the Remote I/O PCIe slot, a MeMAN Shared Memory Access Controller (SMAC) [703] which controls the read/write access via the Local Memory Interface [702] to the collective "global" memory resources on the card [704], MeMAN Memory Manager [705] onboard the SMAC, responsible for control/configuration/status for the memory card, a small amount of SDRAM [706] for use as necessary by the Memory Manager [705], and a small amount of non-volatile flash memory [707] for Memory Manager program and SMAC [703] storage—including various options for simultaneous multiple host access.

The memory address range for a card may be advantageously configured multiple ways. The Memory Manager [705] configures the SMAC Logic [703] to allow multiple hosts or clients to map the global memory [704] within their respective address space despite being located remotely on the network. Although the memory may be global, the memory address range for a card may be flexibly configured such that it is exclusive to one host or the memory address range may be mapped to multiple hosts, such that collaboration or parallel processing of data may occur. In the case where the same memory address range is mapped to multiple clients, any number of multiprocessor memory space sharing schemes may be configured by the MeMAN Memory Manager and employed by the MeMAN SMAC logic. The memory resources may be simultaneously shared or serially shared.

In one preferred embodiment, the MeMAN Memory Manager [705] is an embedded microcontroller, running real-time firmware to configure and supervise the SMAC logic [703] and the SMAC itself is implemented via an FPGA or ASIC Device. The SMAC [703] logic is configurable by the Memory Manager [705] to enable various schemes for simultaneous multiple host access and memory map sharing via a network. The SMAC [703] provides a solution for combining local memory [704] interfacing capabilities with the handling of multiple client hosts implementing virtualized memory-mapped I/O systems, such that the memory [704] on the card becomes a global resource. The end result is a widely distributed extremely powerful and scalable memory-mapped computer cluster, sharing a 2^64 byte memory space.

Figure 8:
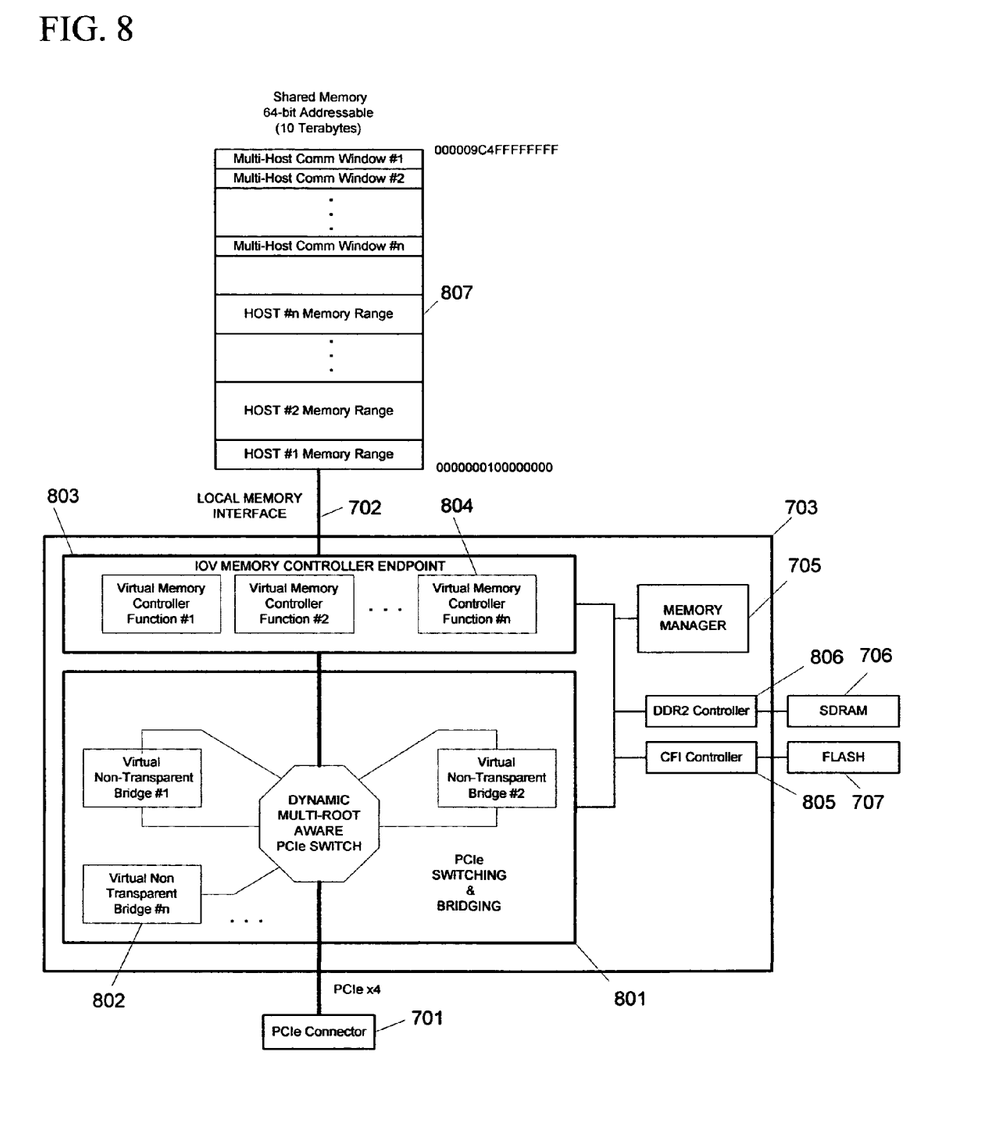
FIG. 8 is a block diagram of the MeMAN SMAC and associated shared memory map.

As a means of illustration and example of how the SMAC may be configured for operation is given in FIG. 8. In this preferred embodiment, the SMAC [703] logic is configured by the Memory Manager for PCI/PCI Express non-transparent bridging [801] to create multiple virtual non-transparent bridges [802]. The non-transparent bridging enables multiple clients to access the memory in a controlled manner. Each virtual non-transparent bridge [802] is associated with one of the clients, and provides a separate address range for memory resources. This avoids memory resource enumeration conflicts amongst the clients, separates processing domains, and facilitates communication between the processing domains.

Each virtual non-transparent bridge [802] interfaces to a corresponding Virtual Memory Controller Function [804] that is part of a downstream Multi-root IOV Memory Controller Endpoint [803]. Each Virtual Memory Controller Function [804] provides access to a corresponding Memory Range [807] within the Shared Memory.

Supporting blocks include a DDR2 Memory Controller [806] utilized by the Memory Manager [705] for access to the SDRAM [706] and a CFI controller [805] utilized by the Memory Manager [705] for access to the Flash memory [707].

Common criticisms of shared memory architectures as described in the current art covering multiprocessor systems is that they are limited in their ability to scale to support a large number of host machines and limited in their ability to have large distances between host machines. The invention advantageously addresses both of these concerns, with the MeMAN solid state memory card [401] and the SMAC [703] enabling access to global shared memory [704] by a large number of host machines, and long distances (essentially global in reach) between host machines are possible via Ethernet utilizing i(e)-PCI and the Internet utilizing i-PCI.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A memory control module configured to enable multiple hosts to simultaneously access a shared centralized memory resource via a virtualization protocol utilizing a network transport; further including:
   configurable logic configured to enable multiple schemes of sharing the centralized memory resource with remote clients;
   a memory manager function configured to control and configure the configurable logic; and
   interface and control logic configured to interface to the shared centralized memory resource, wherein the configurable logic is configurable by the memory manager function for PCI/PCI Express non-transparent bridging to create multiple virtual non-transparent bridges.

2. The module as specified in claim 1 wherein each said virtual non-transparent bridge is configured to be associated with one of the clients, and configured to provide a separate address range for memory resources.

3. The module as specified in claim 2 wherein each said virtual non-transparent bridge is configured to avoid memory resource enumeration conflicts amongst the clients, separate processing domains, and facilitate communication between the processing domains.

4. The module as specified in claim 2 wherein each said virtual non-transparent bridge is configured to interface to a corresponding virtual memory controller function that is part of a downstream Multi-root IOV Memory Controller Endpoint.

5. The module as specified in claim 4 wherein each said virtual memory controller function is configured to provide access to a corresponding memory range within the shared centralized memory.

6. The module as specified in claim 1 wherein the module is a card configured to interface with a remote I/O slot.

7. The module as specified in claim 1 wherein the module is configured to operate as part of a distributed memory mapped computer-cluster.

8. The module as specified in claim 1, where the network transport is defined by the Internet Protocol Suite.

9. The module as specified in claim 8, where the network transport is TCP/IP.

10. The module as specified in claim 1, where the transport is LAN.

11. The module as specified in claim 10, where the LAN is an Ethernet.

12. The module as specified in claim 1, where the transport is a direct connect arrangement configured to utilize an Ethernet physical layer as the transport link, without consideration of a MAC hardware address or any interceding external Ethernet switch.

13. The module as specified in claim 1, where the transport is a wireless transport.

14. The module as specified in claim 1, where the virtualization protocol is i-PCI.

15. The module as specified in claim 1 further configured to combine a local memory interface associated with the centralized memory-mapped resource, with handling of multiple hosts implementing virtualized memory-mapped I/O systems, such that the local memory becomes a global resource.

16. The module as specified in claim 15 where the local memory is client memory and access is byte or bit oriented, such as allowed by the PCI or PCI Express protocol.

17. The module as specified in claim 1 wherein the configurable logic and the memory manger function are configured to enable simultaneous multiple host access and memory map sharing via the transport.

18. A memory control module configured to enable multiple hosts to simultaneously access a shared centralized memory resource via a virtualization protocol utilizing a network transport; further including:
- configurable logic configured to enable multiple schemes of sharing the centralized memory resource with remote clients;
- a memory manger function configured to control and configure the configurable logic; and
- interface and control logic configured to interface to the shared centralized memory resource, wherein the memory manager function is an embedded microcontroller, configured to run real-time firmware to configure and supervise the configurable logic.

* * * * *